United States Patent [19]

Tsuji

[11] 4,314,619
[45] Feb. 9, 1982

[54] OPERATING DEVICE FOR SWIVEL WORKING VEHICLE

[75] Inventor: Keiro Tsuji, Osaka, Japan

[73] Assignee: Kubota, Ltd., Japan

[21] Appl. No.: 67,562

[22] Filed: Aug. 17, 1979

[30] Foreign Application Priority Data

Aug. 24, 1978 [JP] Japan .......................... 53-116613[U]

[51] Int. Cl.$^3$ ............................................. B60K 41/16
[52] U.S. Cl. ............................ 180/327; 74/471 XY; 180/333; 180/336
[58] Field of Search ................... 180/77 S, 77 R, 6.58, 180/6.66, 315, 321, 333, 336, 327; 74/471 XY, 473 R, 879; 192/0.092

[56] References Cited

U.S. PATENT DOCUMENTS

| | | | |
|---|---|---|---|
| 2,855,110 | 10/1958 | Prichard | 212/38 |
| 3,386,523 | 6/1968 | Ruhl | 180/6.66 |
| 3,451,560 | 6/1969 | Witwer | 212/38 |
| 3,768,328 | 10/1973 | Campbell | 74/471 XY |
| 3,795,157 | 3/1974 | Campbell | 74/473 R |

Primary Examiner—John A. Pekar
Attorney, Agent, or Firm—Kane, Dalsimer, Kane, Sullivan and Kurucz

[57] ABSTRACT

An operating device for a swivel working machine so constructed that a fluid pressure motor disposed at the vehicle body is rotated in the forward and reverse directions and stopped by a control valve disposed on the swivel base, and that speed change gears between said motor and travelling means are interlockingly connected to a swing lever disposed at said swivel base. Said lever is constructed so as to be swingingly operated in two directions and its swing operations in one direction and in the other direction may operate said control valve and said speed change gears, respectively.

3 Claims, 6 Drawing Figures

OPERATING DEVICE FOR SWIVEL WORKING VEHICLE

BACKGROUND OF THE INVENTION

The present invention relates to an operating device for a swivel working vehicle in which a fluid pressure motor disposed on the vehicle body is rotated in the forward and reverse directions and is stopped by a control valve disposed at a swivel base, and in which speed change gears between the motor and travelling means are interlockingly connected to a swing lever disposed at the swivel base.

Conventionally, two levers have been used for the operation of the control valve for switching the forward/backward travelling and for the operation of speed change gears, respectively. Such arrangement has not only complicated the operation system but aslo required the two-handed operation and the shifting from one hand to the other in the lever operation, resulting in a poor maneuverability. Such operational complications have been disadvantageous in the particular case where frequent lever operations are required such as for a swivel working vehicle.

SUMMARY OF THE INVENTION

In view of the defects above-mentioned, it is an object of the present invention to overcome such defects with simple improvements in the construction.

In order to achieve this object, the operating device for a swivel working vehicle according to the present invention is constructed in such a manner that a fluid pressure motor disposed on the vehicle body may be rotated in the forward and reverse directions and stopped by a control valve disposed on a swivel base, and that speed change gears between the motor and travelling means are interlockingly connected to a swing lever disposed at the swivel base, and is characterized in that the lever constructed in a manner swinging in two directions is interlockingly connected to the valve and the swing operation of the lever in one direction permits the speed change gears to be ready for operation, while the swing operation of the lever in the other direction permits the valve to be ready for operation.

Thus, by the selective operation of a single lever, the vehicle body may travel in the forward and rearward direction and its speed change operation may also be controlled, thereby simplifying the travelling control system and therefore reducing the manufacturing cost of the control structure. Furthermore, the present invention permits such selective operation to be performed with the single hand, thus providing a good maneuverability.

Other objects and advantages of the present invention will be apparent from the following detailed description.

BRIEF DESCRIPTION OF THE DRAWINGS

The present invention will be further described by way of example, with reference to the accompanying drawings, in which.

DETAILED DESCRIPTION OF THE PREFERRED EMBODIMENTS

Figure 1:
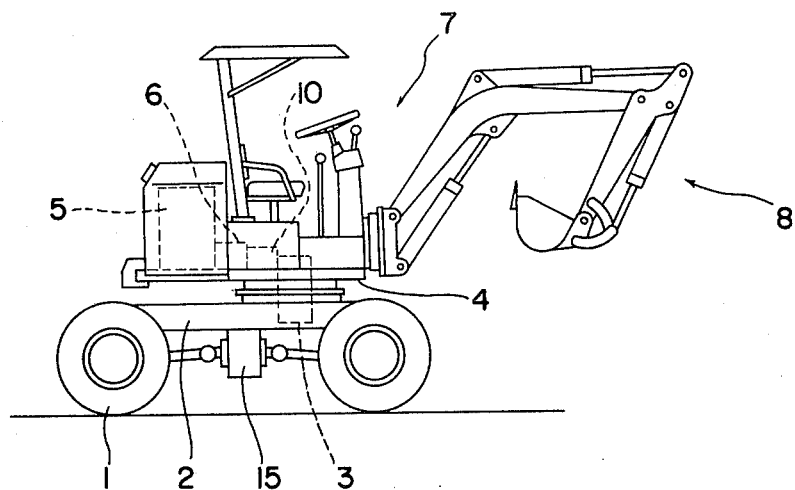
FIG. 1 is a general side view of a swivel working vehicle.
Figure 2:
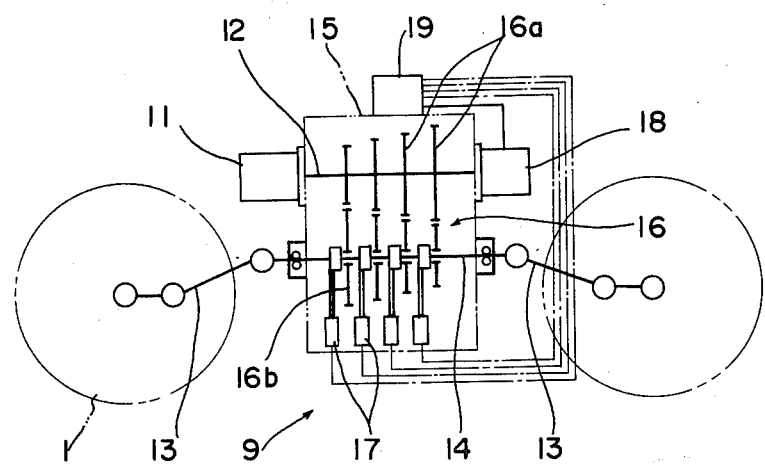
FIG. 2 is a schematic diagram of speed change gears.

As shown in the drawings, a swivel working vehicle is formed in such a way that, through a rotary joint 3, a swivel base 4 is mounted to a vehicle body 2 provided with travelling means 1 of the all-wheel drive type. An engine 5, a fluid pressure pump 6 connected thereto and a steering unit 7 are mounted to this swivel base 4, and a back hoe 8 for excavation is also mounted to this swivel base 4.

Speed change gears 9 for the travelling means 1 are constructed in the following way. Connected to an input shaft 12 is a fluid pressure motor 11 to be rotated in the forward and reverse directions and stopped by a control valve 10 mounted to the swivel base 4. Mounted to a transmission case 15 on the vehicle body 2 are this input shaft 12 and an output shaft 14 for transmission shafts 13. A speed change mechanism 16 comprises four pairs of gears normally meshing with the input shaft 12 and the output shaft 14. Gears 16a are securely fixed to the input shaft 12, while gears 16b are rotatably disposed at the output shaft 14. Speed change drive units 17 are disposed between the gears 16b and the output shaft 14 for selectively incorporating the gears 16b located at the output side, to the output shaft 14 by means of the pressure of a fluid. A fluid pressure pump 18 secured to the transmission case 15 which serves also as a tank, is connected to the input shaft 12. Disposed at the discharge passage of this pump 18 is a valve 19 for speed change for causing the speed change drive units 17 to be operated in succession, whereby control of the motor 11 by the valve 10 and control of the speed change mechanism 16 by the valve 19 may provide forward and backward 4-stage speed change.

The valve 19 for speed change comprises a push-pull type operation valve 20 for causing the speed change drive units 17 to be operated in succession from the status where the pump 18 is communicated with a tank port a, and a modulation valve 21 for stabilizing the working characteristics of the speed change drive units 17 at their starting stage.

Figure 3:
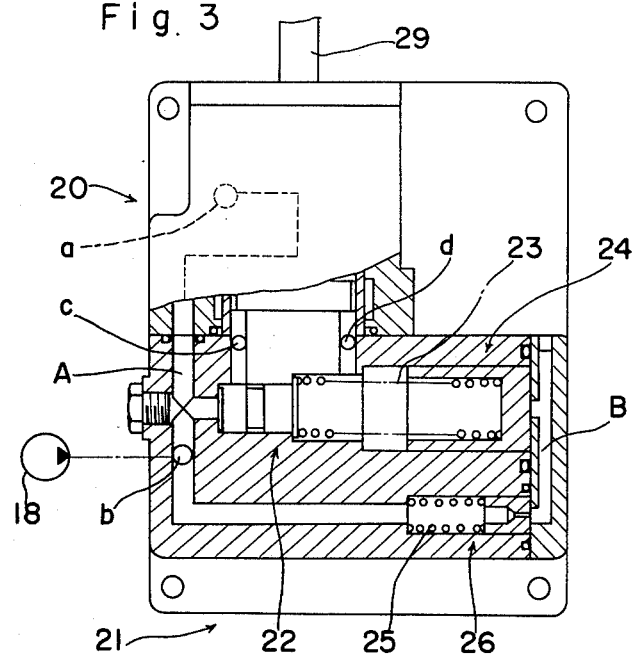
FIG. 3 is a front view with portions broken away of a valve for speed change.
Figure 4:
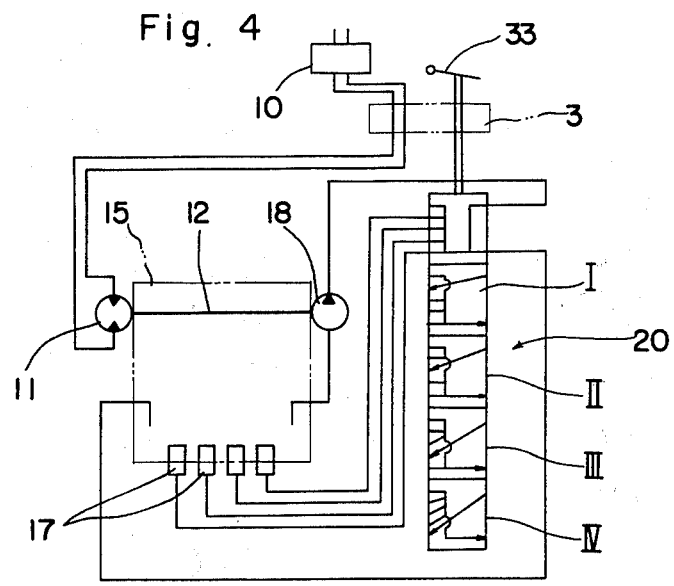
FIG. 4 is a system diagram of the pressure of a fluid.

As shown in FIG. 3, a relief valve 22 adapted to be opened by a rise in pressure in a pump port b accompanied by the opening of the valve 20, is connected to a flow passage A communicated with the pump port b. A single acting cylinder 24 is disposed for closing this relief valve 22 through a spring 23, and the area of this cylinder 24 on which pressure is applied, is formed as larger than the area of the relief valve 22 on which pressure is applied.

A flow passage B for actuating the cylinder 24 by the rise in pressure in the flow passage A, is communicated with the flow passage A. A uni-directional throttle valve 26 is disposed in the flow passage B. This throttle valve 26 is adapted to throttle and supply a pressurized fluid to the cylinder when the pressure in the flow passage A is increased, and to be released from its throttle status by means of the spring-load of the spring 23 against a spring 25 when the pressure in the flow passage A is decreased. Accordingly, at the early stage just after opening the operation valve 20 which permits the speed change drive units 17 to be operated in succession, the pump 18 is communicated with the first drive unit 17 and portions of the pressurized fluid are discharged to a port c through the relief valve 22. At the same time, the pressurized fluid is throttled and supplied to the cylinder 24 through the throttle valve 25, and the relief valve 22 is then gradually closed due to a difference in the pressure receiving area, thereby to stabilize the working characteristics of the fluid supply operation at the starting stage. This permits the vehicle body 2 to be smoothly started and the cylinder 24 to quickly reach the stroke end at the time of switching the speed change valve 19, so that the fluid supply to the first drive unit 17 is stopped and fluid supply similar to that above-mentioned is then performed to the subsequent drive unit 17, thereby to provide smooth speed change. Thus, travelling departure and speed change may smoothly be done by stabilizing the working characteristics in the operation of supplying a fluid to the drive units 17 at the starting stage.

The description will then be made on the construction of an operating device 27 for the operation valve 20 of the speed change valve 19 disposed at the vehicle body side and the control valve 10 disposed at the swivel base side.

Figure 5:
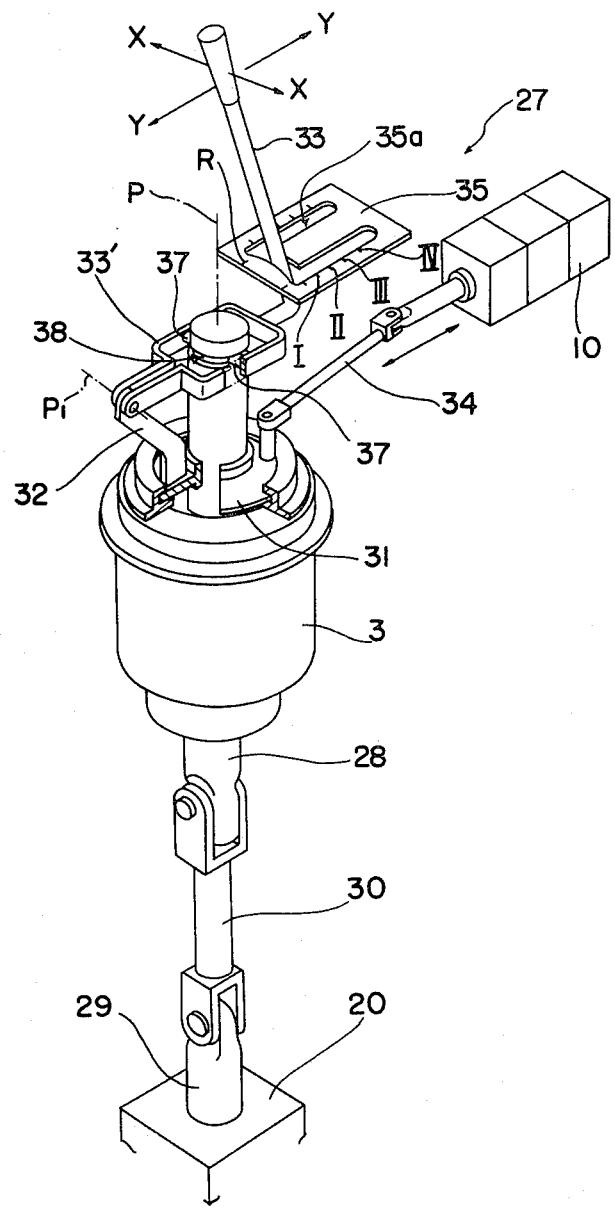
FIG. 5 is a perspective view of an operating device according to the present invention.

As shown in FIG. 5, a rod 28 is rotatably inserted into the center portion of the rotary joint 3. This rod 28 is coupled to a push-pull actuating member 29 for the valve 20 by an operation member 30. A member 31 is disposed in a manner rotatable around the longitudinal axis P with respect to the rod 28 and the swivel base 4. A lever 33 is pivoted, in a manner swinging around the transverse axis $P_1$, to a bracket 32 vertically disposed at the member 31.

That portion of the lever 33 between the grip portion and the pivoted portion is constructed in the shape of a frame 33', at the center of which the upper end of the rod 28 is located. Two pins 37 are oppositely disposed inside the frame 33', and the rod 28 is provided with a peripheral groove 38 into which these pins 37 are to be fitted. That is, when the frame 33', is rotated around the rod 28 by the operation of the lever 33 and when the whole swivel base 4 including the bracket 32 is rotated around the rod 28, the pins 37 are always fitted into the peripheral groove 38, thereby to provide a status where the rod 28 is ready for the push-pull operation.

The control valve 10 is connected to the rotary member 31 through a horizontal rod 34. With such arrangement, the swing operation of the lever 33 in one direction around the transverse axis $P_1$ permits the operation valve 20 of the speed change gears 9 to be ready for the push-pull operation, and the swing operation of the same lever 33 in another direction around the longitudinal axis P permits the control valve 10 for the fluid pressure motor 11 to be ready for the push-pull operation.

In the operating device 27 discussed hereinbefore, the lever 33 to be swingingly operated in the cross direction is guided in the U-shape groove 35a in a guide 35 connected to the swivel base 4. The swing operation of the lever 33 in a first direction (X—X) in the groove 35a may provide the switching of forward/reverse rotation positions F and R of the motor 11 including its stop position S, while the swing operation of the lever 33 in a second direction (Y—Y) may provide the switching of speed change positions I to IV of the speed change gears 9.

When the viscosity of a fluid in the case 15 becomes low for example in a severe winter season, the lever 33 may be switched to either the forward rotation position F or the reverse rotation position R and the pump 18 may be idle driven by the motor 11 with the speed change gears 9 set to the neutral position, so that the temperature of the fluid in the case 15 may be increased thereby to raise the viscosity of such fluid. Accordingly, even though in a severe winter season, the speed change drive units 17 may be operated at a predetermined temperature and the vehicle body may therefore travel smoothly.

Figure 6:
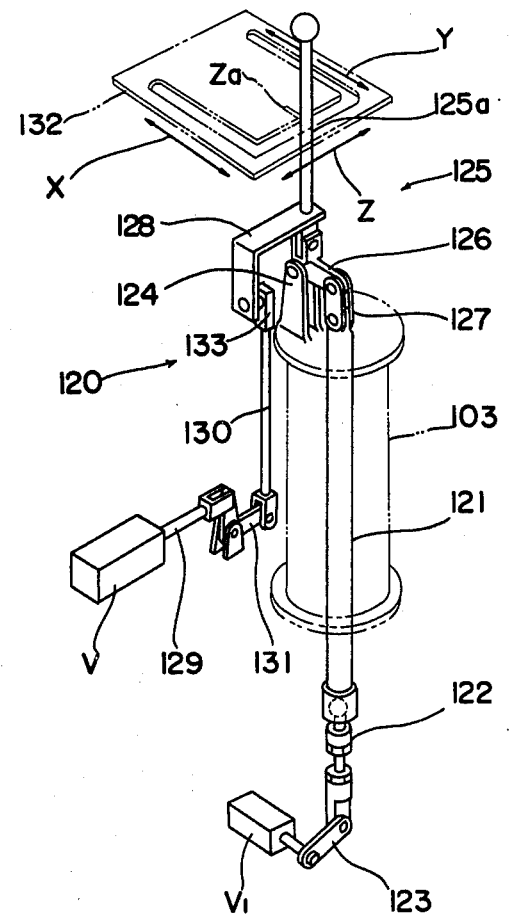
FIG. 6 is a perspective view with portion broken away of another embodiment of the operating device.

FIG. 6 shows another embodiment of the operating device 27 above-mentioned.

The description will then be made of the construction of an operating structure 120 for a valve V disposed at the swivel base 4 and adapted to control the rotation of the swivel base 4, and a valve $V_1$ disposed at the vehicle body 2 and adapted to control the travelling thereof.

A rod 121 is rotatably inserted into the center portion of a rotary joint 103. An operation member 122 is connected to the lower end of this rod 121 through a rotatable coupling structure capable of being turned. This operation member 122 is pivoted to an arm 123 connected to the rotary speed change shaft of the valve $V_1$. A bracket 124 is vertically disposed on the rotary joint 103 at the swivel base side. A lever 125 as speed change operating means is disposed in a manner swinging around the transverse axis. An arm 126 connected to this lever 125 is pivoted to the upper end of the rod 121 by a link 127, so that the valve $V_1$ at the side of the travelling vehicle body 2 may be located at five positions by the swing operations of the lever 125.

The swing lever 125 is formed in a manner rotatable also around the transverse axis at right angle to the lever swing axis. An arm 128 is disposed at such rotatable portion 125a. This arm 128 is pivotally connected to a push-pull operation rod 129 of the valve V through a rod 130 and a bell crank 131.

With such arrangement, the valve V may be located at three positions by the swing operation of the lever portion 125a. It is noted that the rod 130 is coupled to the arm 128 through a ball joint 133.

There is also disposed a guide plate 132 having therein a U-shape guide groove provided with a forward operation area A, a backward operation area Y and a neutral operation area Z between the both areas of X and Y.

In summary, only one lever disposed at the side of the swivel base 4 may operate the valve V disposed at the side of the swivel base 4 and the valve $V_1$ disposed at the side of the travelling vehicle body 2, regardless of the relative rotation of the swivel base 4 with respect to the travelling vehicle body 2.

I claim:

1. An operating device for a swivel working vehicle, comprising:
   a vehicle body;
   a rotary joint mounted to said vehicle body;
   a swivel base mounted to said rotary joint;
   a fluid pressure motor capable of rotation in forward and reverse directions;
   a control valve operatively connected to and capable of causing said fluid pressure motor to be rotated in the forward and reverse directions and of stopping said fluid pressure motor, said control valve being mounted to said swivel base;
   travelling means mounted to said vehicle body;
   speed change gears disposed between said fluid pressure motor and said travelling means;

an operation valve for operating said speed change gears;

a mechanical interlocking mechanism including a push-pull rod passing through the center portion of said rotary joint;

a swing lever capable of being moved in two directions, said mechanical interlocking means including means operatively connecting said swing lever to said control valve such that when said swing lever is moved in one direction, said control valve is capable of operation, and said push-pull rod connecting said swing lever and said operation valve such that when said swing lever is moved in another direction, said operation valve is capable of operation.

2. A device as set forth in claim 1 further including a guide from which said lever extends, said guide being constructed to guide said lever such that said control valve is operable to cause said fluid pressure motor to be rotated in the forward and reverse directions and to stop said fluid pressure motor only when said speed change gears are set to a neutral position.

3. A device as set forth in claim 1 further including:

a frame portion on said swing lever;

a peripheral groove within said push-pull rod, said frame portion extending around said groove;

pins attached to said frame portion and extending within said groove, said swing lever thereby being movable about the longitudinal axis of said push-pull rod;

a member disposed in a rotable manner about the longitudinal axis of said push-pull rod;

a bracket attached to said member, said swing lever having an end pivotally secured to said bracket such that it is pivotable about an axis transverse to said longitudinal axis; and a rod connecting said member and said control valve.

* * * * *